United States Patent Office 2,958,681
Patented Nov. 1, 1960

2,958,681

CRYSTALLINE POLYALLYL-TRIMETHYLSILANE

Tod W. Campbell, Wilmington, Del., assignor to E. I. du Pont de Nemours and Company, Wilmington, Del., a corporation of Delaware No Drawing. Filed Nov. 30, 1956, Ser. No. 625,221

6 Claims. (Cl. 260—80)

The present invention relates to high melting crystalline polymeric allyl trimethylsilane.

Certain physical properties of allyl trimethylsilane and many related compounds have been described by Sommer, Tyler and Whitmore, Journal of the American Chemical Society, volume 70, page 2872 (1948), and Burkhard, Journal of the American Chemical Society, volume 72, page 1,078 (1950). It boils at 85.5° C. at 760 mm. and is a colorless liquid. However, no practical uses of these compounds have been disclosed.

It has been found that of the large number of compounds studied, allyl trimethylsilane may be polymerized to produce a useful polymer.

It is therefore an object of the present invention to provide a useful high molecular weight solid polymer of allyl trimethylsilane. It is another object to provide shaped articles of poly-(allyl trimethylsilane). Other objects will appear as the description of the invention proceeds.

These objects are accomplished by polymerizing allyl trimethylsilane in the presence of a coordination catalyst such as a titanium-containing coordination catalyst and shaping the thus formed polymer by known methods into useful objects.

The following examples are given by way of illustration only and are not to be construed as limiting the invention:

Example I

A catalyst suspension is prepared from 2.84 parts lithium aluminum tetradecyl in cyclohexane, 0.82 part of titanium tetrachloride and 58 parts of cyclohexane, all parts being by weight. To this catalyst suspension 8 parts by weight of allyl trimethylsilane is added in a closed vessel and the polymerization is allowed to proceed at room temperature and autogenous pressure for 36 hours. After this period the polymer is isolated by treatment of the reaction mixture with alcohol, and the powdery polymer is isolated by filtration in a yield of 6.0 parts. After extracting the solid with ether to remove low molecular weight oils and drying, it is pressed into a clear, stiff, colorless, film at 240° C. on a Carver press. The film shows high X-ray crystallinity and a crystalline melting point of about 265° C. with some discoloration.

Example II 3 g. of the polymer from Example I is finely divided and mixed intimately with 1.5 g. of chlorinated diphenyl ether, and the mixture is compression molded at 250° C. to a plug. This plug is melt extruded at 270° C. through a 0.03 inch diameter orifice to give short filaments, which, after extracting of the plasticizer with cyclohexane are crystalline and can be oriented by drawing over a hot plate or hot pin at 200° C.

The polymer of the present invention is, judging from its insolubility, crystallinity, and the X-ray pattern, suspected to be isotactic, and can be prepared, as demonstrated, very easily by the use of a titanium-containing coordination catalyst. Similar coordination catalysts, of course, can also be used and may be substituted in like amount for the corresponding titanium catalyst used in the examples. Generally, such a catalyst can be made by combining a metal compound in which the cation is in a higher valence state than its lowest possible valence, with organic compounds containing ethylenic unsaturation, and admixing this compound with a reducing agent, i.e. lithium aluminum hydride, thus converting the metal in its lowest valence state where it becomes a highly active catalyst for the applicant's purpose. Among the cations producing the above type coordination catalysts are, besides titanium, the transition cations, namely, Zr, Ce, V, Nb, Ta, Cr, Mo, or W, or any combination thereof.

The described polymer is useful wherever a high melting material is desired, for instance, in conveyor and power transmission belts, gasketing, hot air and steam hoses, wire insulation, insulation tapes and laminates in the electrical field, as reinforcing materials for thermosetting and thermoplastic resins or in glass, etc.

It will be apparent that many widely different embodiments of this invention may be made without departing from the spirit and scope thereof, and therefore it is not intended to be limited except as indicated in the appended claims.

I claim:

1. A solid homo-polymer of allyl trimethylsilane having a high X-ray crystallinity.
2. A homo-polymer of allyl trimethylsilane having a high X-ray crystallinity and a crystalline melting point of about 265° C.
3. The polymer of claim 2 in the form of a film.
4. The polymer of claim 2 in the form of a filament.
5. The filament of claim 4 which has been oriented by drawing over a hot surface at about 200° C.
6. The process of polymerizing allyl trimethylsilane which comprises mixing therewith a coordination catalyst prepared by forming a suspension of lithium aluminum tetradecyl and titanium tetrachloride in an organic liquid, and maintaining polymerizing conditions at about room temperature until a solid polymer having a high X-ray crystallinity is obtained.

References Cited in the file of this patent

FOREIGN PATENTS 538,782     Belgium _____ Dec. 6, 1955

OTHER REFERENCES

Sommer et al.: J. Am. Chem. Soc., vol. 70, September 1958, pages 2872–2874.